United States Patent [19]
Osawa et al.

[11] Patent Number: 5,473,642
[45] Date of Patent: Dec. 5, 1995

[54] DATA COMMUNICATION USING SINGLE LOGICAL LINK FOR BROADCAST SESSION

[75] Inventors: Tomoki Osawa; Seiji Kachi, both of Tokyo, Japan

[73] Assignee: NEC Corporation, Japan

[21] Appl. No.: 120,283

[22] Filed: Sep. 13, 1993

[30] Foreign Application Priority Data

Sep. 11, 1992 [JP] Japan .................................. 4-242447

[51] Int. Cl.⁶ .................................................. H04B 7/00
[52] U.S. Cl. ..................... 375/377; 370/85.8; 370/95.2; 340/825.08
[58] Field of Search ........................ 375/377; 370/85.8, 370/94.1, 95.1, 95.2; 340/825.07, 825.08

[56] References Cited

U.S. PATENT DOCUMENTS

| | | | |
|---|---|---|---|
| 4,809,268 | 2/1989 | Tejima et al. | 370/95.2 |
| 4,882,730 | 11/1989 | Shinmyo | 370/95.2 |
| 4,888,767 | 12/1989 | Furuya et al. | 370/95.2 |
| 4,945,355 | 7/1990 | Blanchette | 370/85.8 |
| 5,191,583 | 3/1993 | Pearson et al. | 370/82 |
| 5,272,702 | 12/1993 | Snowbarger et al. | 370/85.8 |

*Primary Examiner*—Young Tse
*Attorney, Agent, or Firm*—Ostrolenk, Faber, Gerb & Soffen

[57] ABSTRACT

In a data communication system having a sending station and multiple receiving stations interconnected by a satellite or a local area network, the sending station transmits a request signal containing an assigned logical link number to the receiving stations. If the assigned logical link is available to each of the receiving stations, each receiving station establishes a logical link to the sending station and transmits an acknowledgement signal to the sending station. During a predetermined period following the transmission of the request signal, the sending station increments a count value in response to receipt of each acknowledgement signal. When the count value exceeds a threshold value, the sending station transmits a broadcast message over the established logical link to the receiving stations. If the count value does not exceed the threshold value during that period, the sending station retransmits the request signal to repeat the count operation to elicit an acknowledgement response from those stations where the assigned link was not previously available.

12 Claims, 6 Drawing Sheets

SENDING STATION

RECEIVING STATION

SENDING STATION

RECEIVING STATION

SENDING STATION

RECEIVING STATION

FIG. 5A SENDING STATION
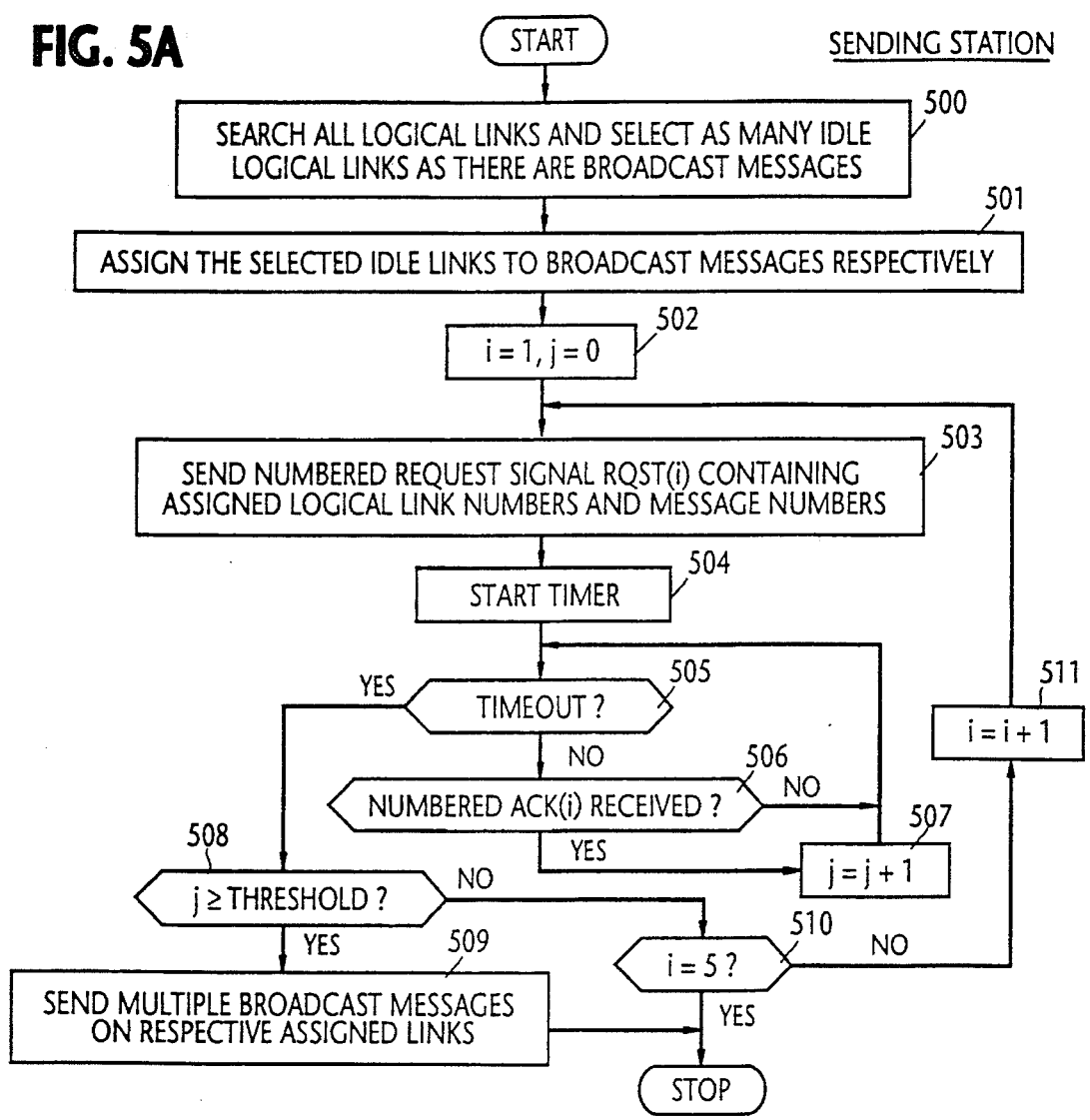
FIG. 5B
RECEIVING STATION
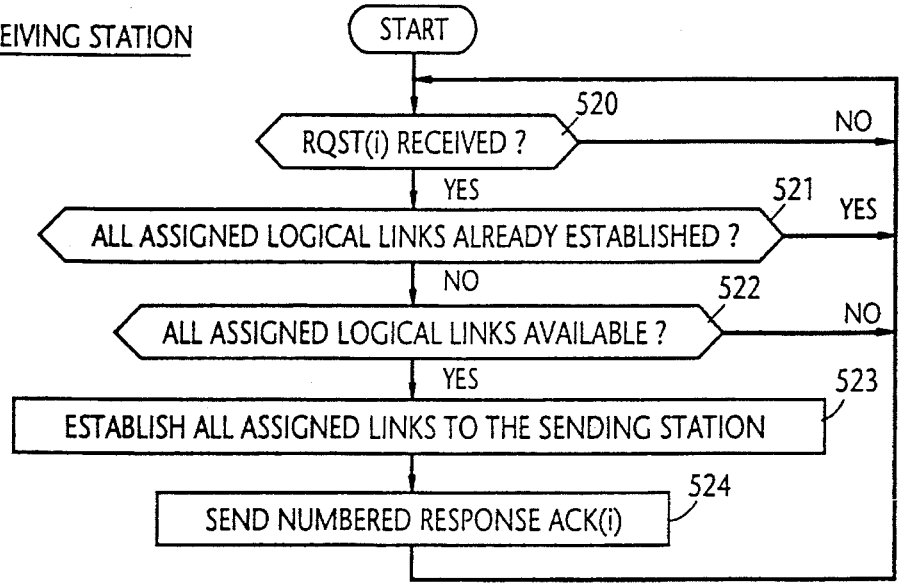

SENDING STATION

RECEIVING STATION

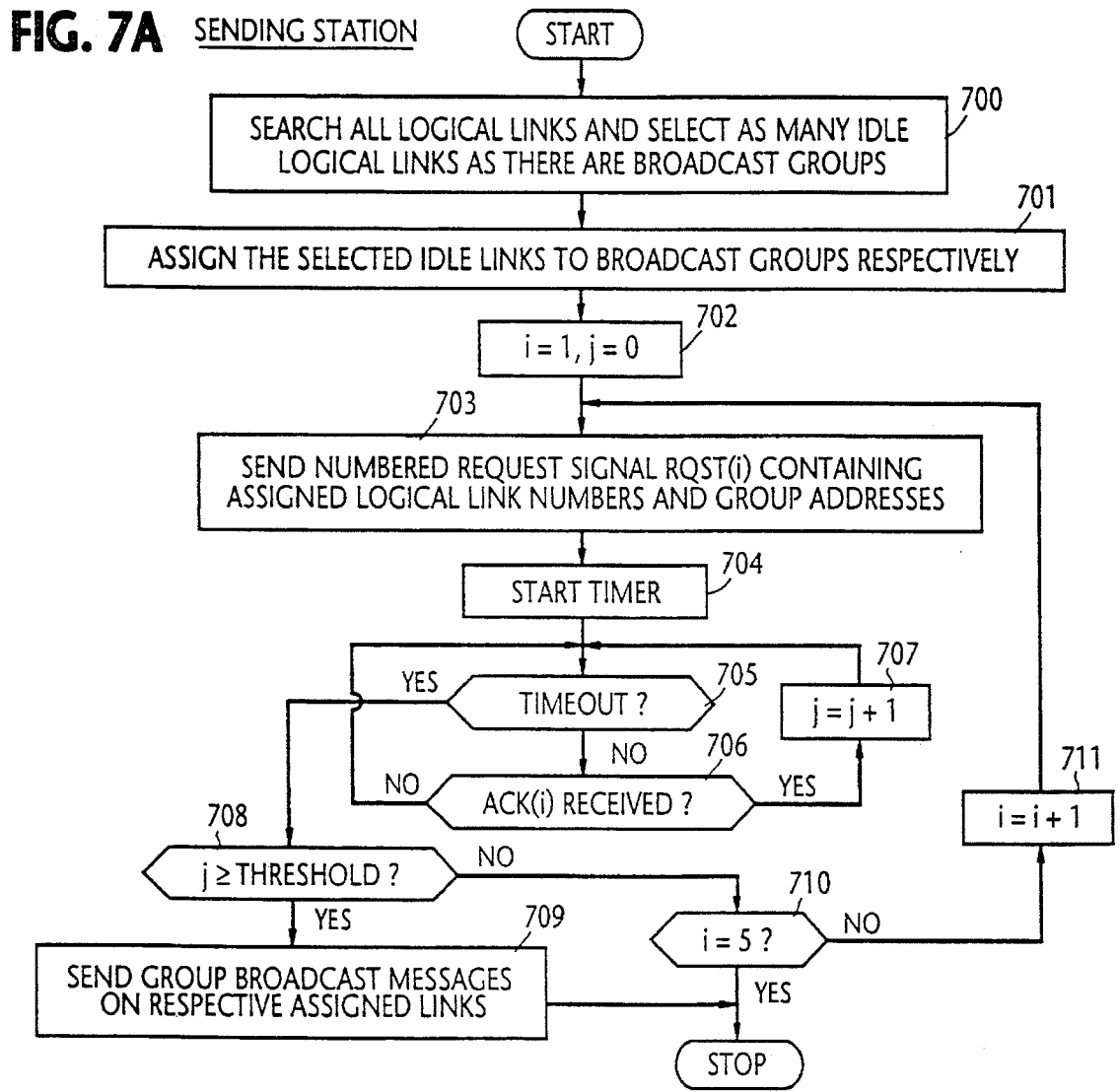
FIG. 7A SENDING STATION
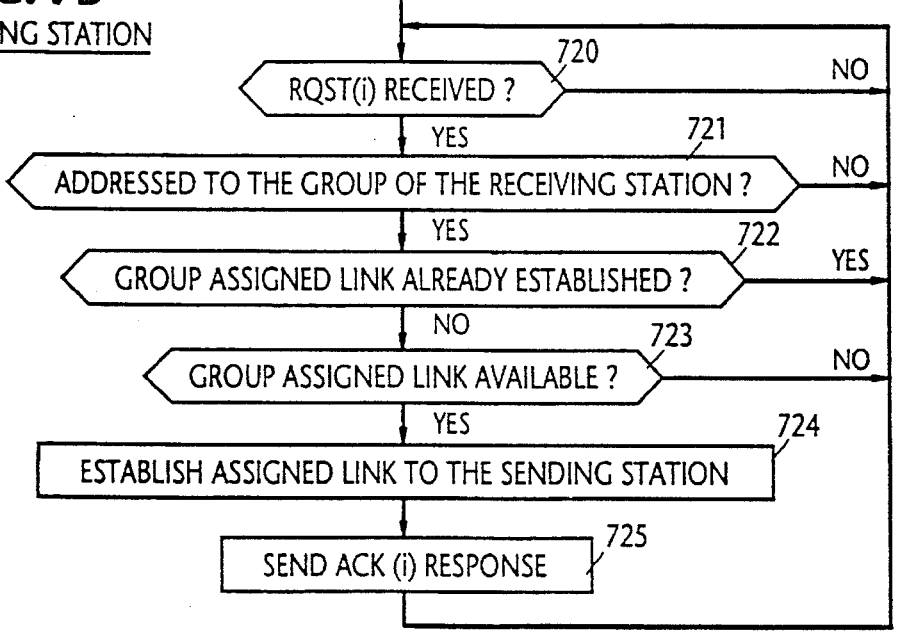
FIG. 7B RECEIVING STATION

DATA COMMUNICATION USING SINGLE LOGICAL LINK FOR BROADCAST SESSION

BACKGROUND OF THE INVENTION

1. Field of the Invention

The present invention relates generally to computer networks, and more specifically, to logical link control for a data communication system operating in a broadcast mode.

2. Description of the Related Art

According to conventional logical link control procedures for a broadcast communication, it is necessary for a sending station to establish a unique logical link to each receiving station on an individual basis. Since it is necessary to keep records of the established logical links, the sending station must be provided with complex control functions. In addition, in a group broadcast mode, the conventional approach is to attach the group address to each broadcast message. However, this reduces the transmission efficiency of the system.

SUMMARY OF THE INVENTION

It is therefore an object of the present invention to provide a data communication system in which only one logical link is established for a broadcast session.

According to the present invention, there is provided a data communication system having a sending station, a plurality of receiving stations and a network for interconnecting the sending station and the receiving stations. The sending station sends a request signal to the receiving stations, which contains a logical link number indicating an idle logical link. Upon receipt of the request signal, each receiving station establishes a logical link to the sending station and transmits an acknowledgment signal to the sending station if the logical link number is available at the receiving station. In response to the acknowledgment signal, the sending station increments a count value for a predetermined timeout period and transmits a broadcast message over the established logical link to the receiving stations when the count value exceeds a threshold value.

In order to elicit an acknowledgment signal from those stations previously failing to return an acknowledgement signal, the same request signal is preferably transmitted again if the response count value does not reach the threshold value during the timeout period following the transmission of this request signal. The transmission of the request signal is repeated a predetermined number of times as long as the response count values does not reach the threshold value.

BRIEF DESCRIPTION OF THE DRAWINGS

The present invention will be described in further detail with reference to the accompanying drawings, in which:

FIGS. 5A and 5B are flowcharts respectively showing the operation of sending and receiving stations according to a variation of the third embodiment;

FIGS. 7A and 7B are flowcharts respectively showing the operation of sending and receiving stations according to a variation of the fourth embodiment.

DETAILED DESCRIPTION

Figure 1:
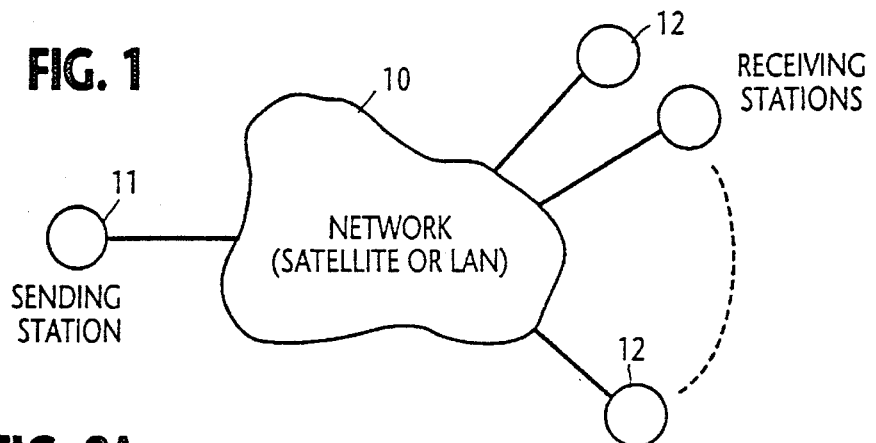
FIG. 1 is a schematic diagram of a data communication system incorporating logical link control protocols according to the present invention.

Referring now to FIG. 1, there is shown a data communication network 10 through which user stations are interconnected. Any of the user stations acts a sending station or a receiving station. In a broadcast mode of communication, a user station 11 is shown as a sending station for transmitting a broadcast message to a plurality of receiving stations 12. The network 10 is either a satellite communications network or a local area network since such networks have multiple access and broadcast capabilities in common. All user stations are designed to operate in accordance with the logical link control procedures defined by the ANS/IEEE standard 802.2. Every user station has a buffer to store all incoming signals and a monitoring device for checking the contents of incoming signals to determine whether each incoming signal is addressed to the user station and whether the sending station has transmitted a request signal containing the address of that user station.

Figure 2A:
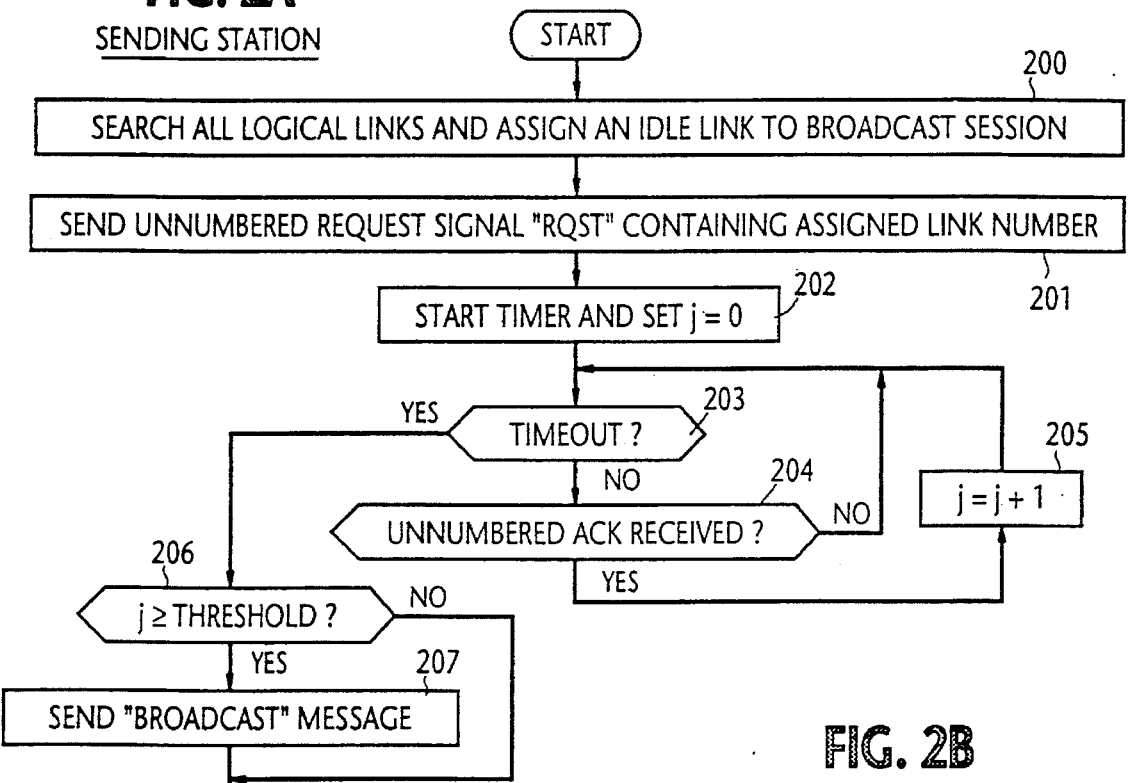
FIGS. 2A and 2B are flowcharts respectively showing the operation of sending and receiving stations according to a first embodiment of the present invention.
Figure 2B:
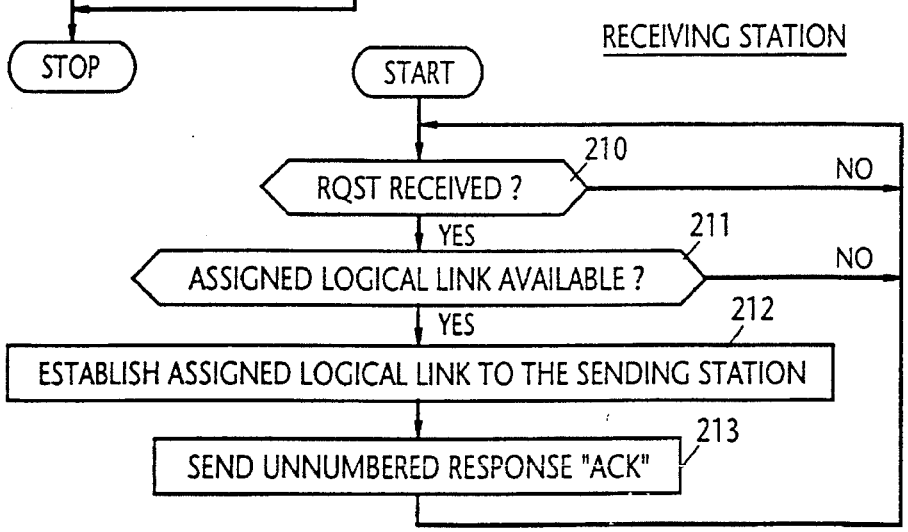

In a first embodiment of the present invention, broadcast-mode logical link control protocols for the sending station 11 and each receiving station 12 are shown respectively in FIGS. 2A and 2B. When the sending station 11 enters a broadcast mode for sending a broadcast message via a broadcast transmitter 11c shown in FIG. 1 to all receiving stations 12, the sending station 11 makes a search through all logical links of the network 10 and assigns an idle logical link to the broadcast session (step 200) and sends an unnumbered broadcast request signal RQST containing the logical link number of the assigned link (step 201) via a request signal generator 11a provided in the sending station 11 as shown in FIG. 1. An acknowledgment timer is then started and a variable "j" of a counter 11b provided in the sending station 11 as shown in FIG. 1 is set equal to zero (step 202). During the acknowledgment period, the sending station 11 checks to see if the timeout period has expired (step 203) and checks the contents of its buffer to see it received an unnumbered acknowledgment (ACK) response from a receiving station 12 (step 204). Each time an ACK is received, control branches at step 204 to step 205 to increment the variable "j" of counter 11b by one and returns to step 203. When the acknowledgment period runs out, control branches at step 203 to step 206 to determine whether the variable j is equal to or greater than a predetermined threshold value. If the decision at step 206 yields an affirmative answer, control exits to step 207 to send a broadcast message via broadcast transmitter 11c over the assigned logical link to all the receiving stations. If the number of the ACK responses received is smaller than the threshold value, control branches at step 206 to the end of the routine and the attempt to broadcast a message is aborted, because an insufficient number of receiving stations have actually received the request signal RQST.

In FIG. 2B, each receiving station 12 has a responder 12a shown in FIG. 1 for checking the contents of its buffer to see if an unnumbered request signal RQST is received (step 210). If the answer is affirmative, control exits to step 211 where the responder 12a checks to see if the assigned logical link is available for the receiving station. If available, the responder 12a of the receiving station 12 establishes the assigned logical link to the sending station (step 212) and transmits an unnumbered ACK response to the sending station (step 213), and then the receiver station 12 remains waiting for a broadcast message to be sent on the established link.

The threshold value against which the number of received ACK responses is compared is chosen to be a minimum number representing a situation where message broadcasting is worthwhile even if not all of the receiving stations have returned an ACK response. It is seen that by using only one logical link for a broadcast session, it is possible for each of the stations connected to the network to act as a sending station and it is possible for a plurality of sending stations to simultaneously transmit their broadcast messages.

At the end of a broadcast session, the broadcast transmitter 11c transmits a command signal to all the receiving stations to clear and shut down the established link.

Figure 3A:
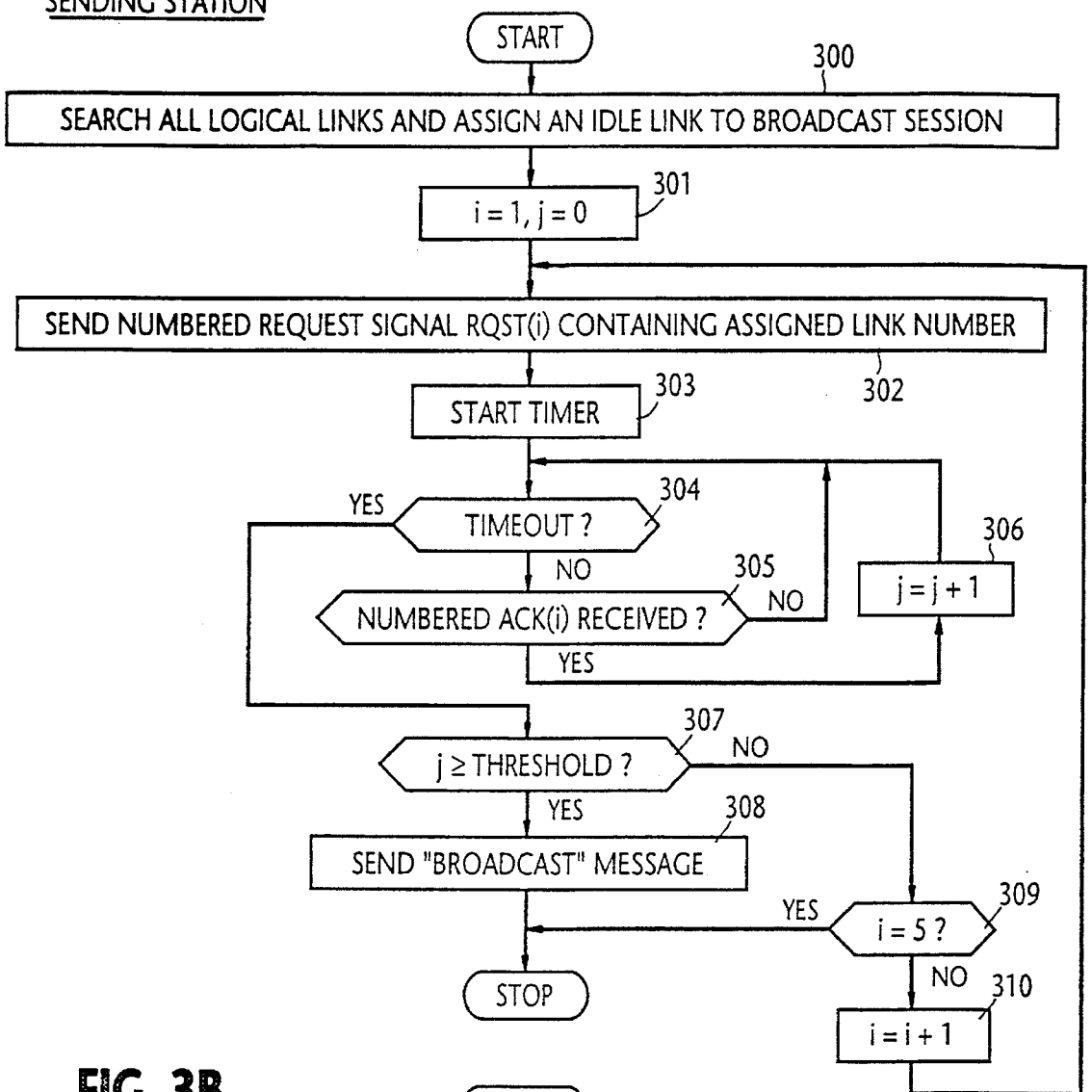
FIGS. 3A and 3B are flowcharts respectively showing the operation of sending and receiving stations according to a second embodiment of the present invention.
Figure 3B:
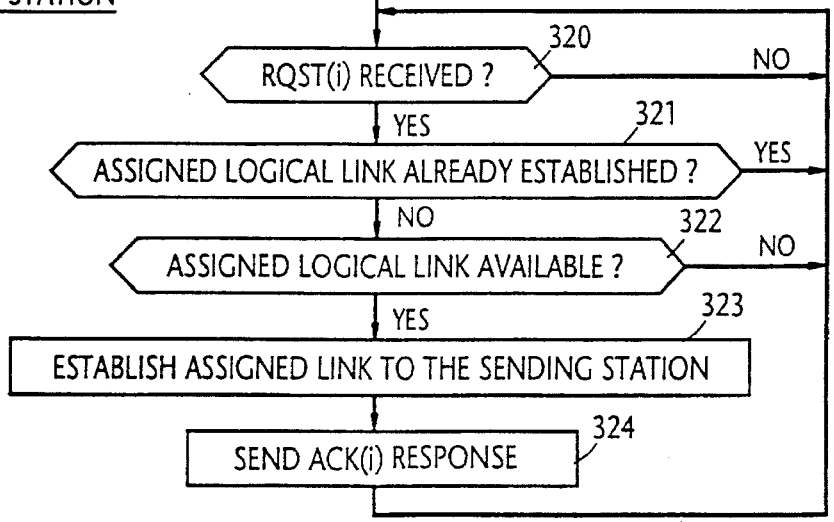

A second embodiment of this invention is shown In FIGS. 3A and 3B in which a broadcast message is repeatedly transmitted if the number of stations that have returned ACK responses is smaller than the threshold value. The broadcast sending station starts the program execution with step 300, identical to step 200, to select and assign an idle logical link to the broadcast session and proceeds to step 301 to set a variable "i" of the counter 11b to one and set a variable "j" of the counter 11a to zero. The variable "i" is a sequential number indicating the number of times the broadcast request is repeatedly transmitted by the request signal generator 11a. Control proceeds to step 302 where the request signal generator 11a sends a numbered request signal RQST(i) containing the assigned logical link number. The acknowledgment timer is then started (step 303). During the acknowledgment period, the sending station checks the timer to see if the timeout period has expired (step 304) and checks the contents of its buffer to see if a numbered ACK(i) response is received (step 305). If a numbered ACK(i) response is received, variable "j" is incremented by one (step 306). When the timeout period expires, control branches at step 304 to step 307 to check to see if variable "j" exceeds the threshold value. If the decision is affirmative, a broadcast message is sent via a broadcast transmitter 11c (step 308). If the number of received ACK(i) responses is smaller than the threshold value, control branches at step 307 to step 309 to determine whether the serial sequential number is equal to a predetermined number, for example, 5. If the counter 11b determines that the sequential number is smaller than 5, variable "l" is incremented by one at step 310 and control returns to step 302 to repeat the process. By repeating the above process, the transmission of a broadcast request is repeated to elicit a response from those stations in which the assigned logical link was not previously available. Since the logical links established from each receiving station to other stations may vary from time to time, the logical link not previously available may be vacated during the time from the arrival of the previous request signal until the next request signal arrives. Therefore, the number of received acknowledgment responses will be increased as the transmission of the request signal is repeated five times.

In FIG. 3B, each responder 12a in each receiving station checks to see if a numbered request signal RQST(l) is received (step 320). If the answer is affirmative, control exit to step 321 to examine the received request signal and the responder 12a checks to see if the assigned logical link is already established between the receiving station and the sending station. If it is, control returns to the start of the routine. If the logical link is already established, control moves to step 322 where the responder 12a checks to see if the assigned logical link is available for the receiving station. If available, the responder 12a of the receiving station establishes the assigned logical link to the sending station (step 323) and transmits a numbered ACK(i) response to the sending station (step 324). If the number of ACK(i) responses returned to the sending station does not exceed the threshold value, the receiving station will further receive the next ACK(i) and repeat the above process. If that number exceeds the threshold, a broadcast message is sent on the established link to each receiving station which has responded to the request.

Figure 4A:
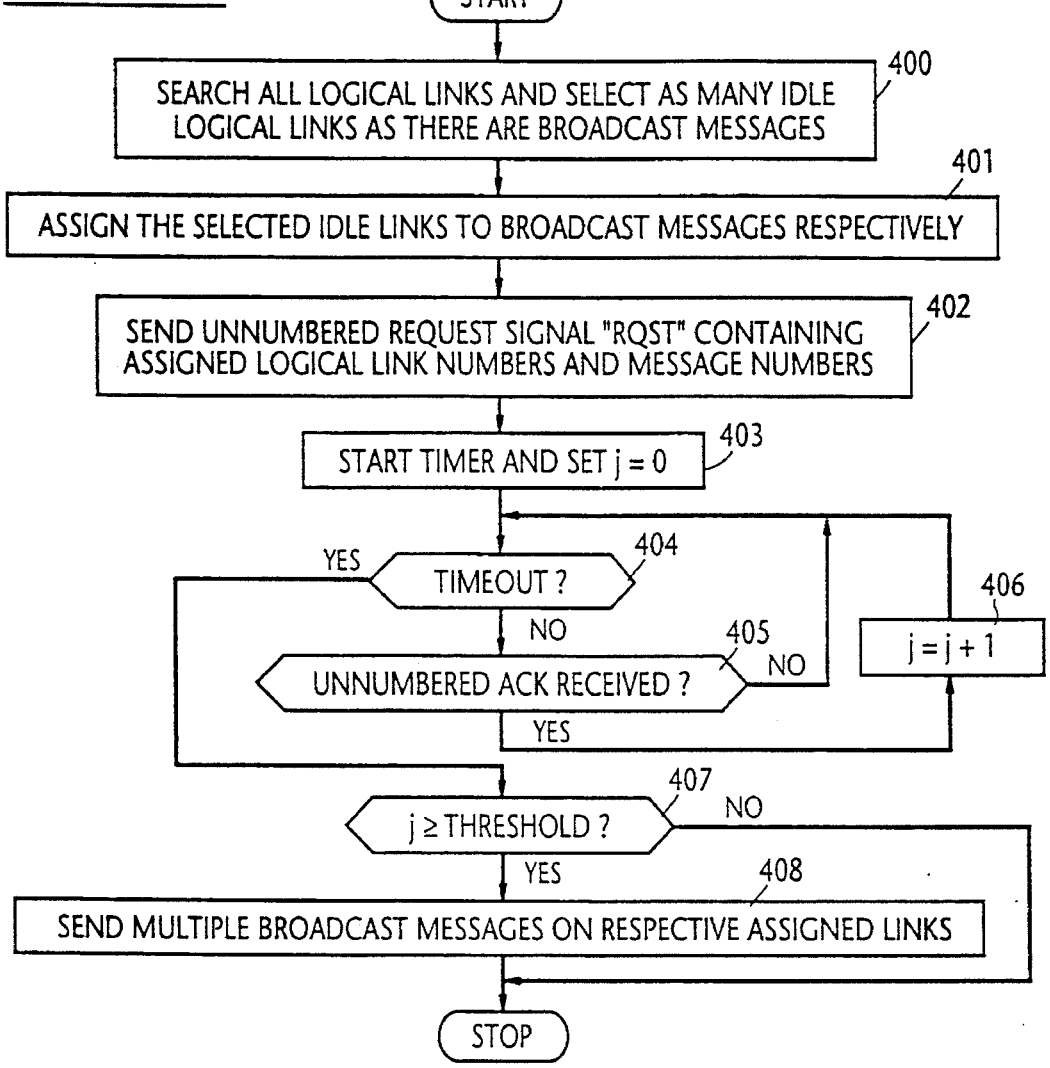
FIGS. 4A and 4B are flowcharts respectively showing the operation of sending and receiving stations according to a third embodiment of the present invention.
Figure 4B:
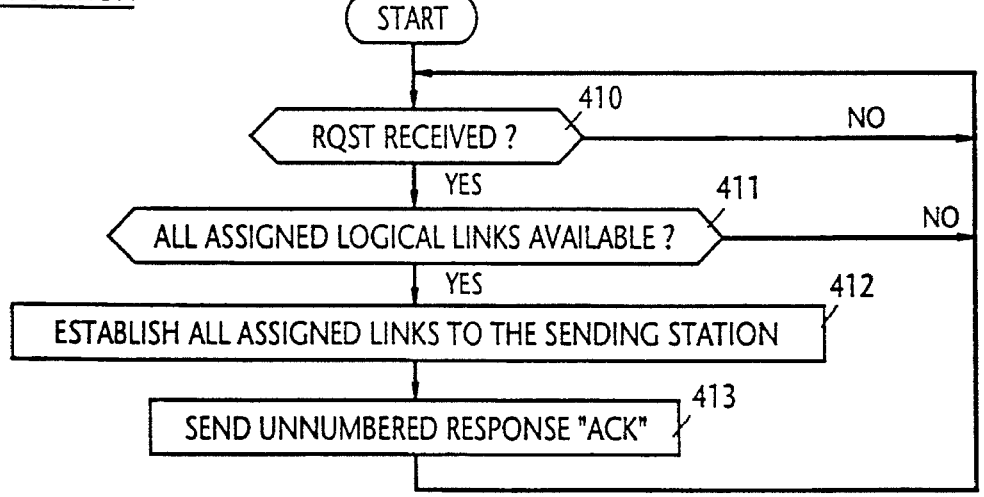

A logical link control protocol according to a third embodiment of the present invention is shown in FIGS. 4A, 4B, 5A and 5B. According to this embodiment, multiple messages are simultaneously broadcast over respective logical links to all the receiving stations, FIGS. 4A and 4B show a variant of the third embodiment in which the multiple broadcast feature is combined with the first embodiment of this invention and FIGS. 5A and 5B show another variant in which the multiple broadcast feature is combined with the second embodiment.

In FIG. 4A, program execution begins with step 400 in which the sending station 11 searches all logical links and selects as many idle logical links as there are broadcast message types and assigns the selected logical links respectively to the messages (step 401). Following step 401, the request signal generator 11a of the sending station 11 transmits, at step 402, an unnumbered request signal RQST containing a list of the assigned logical link numbers and a list of corresponding message numbers. The acknowledgment timer is then started and the variable "j" of counter 11b is set to zero (step 403). During the acknowledgment period, the sending station checks the timer to see if the timeout period has expired (step 404) and checks to see if it received an unnumbered ACK response (step 405). Each time an ACK is received, control branches at step 405 to step 406 to increment the variable "j" by one and returns to step 404. When the acknowledgment period runs out, control branches at step 404 to step 407 to determine whether the variable "j" is equal to or greater than the threshold value. If the decision at step 407 is affirmative, control exits to step 408 to send multiple broadcast messages respectively via broadcast transmitter 11c over the assigned logical links to all the receiving stations. If the number of the received ACK responses is smaller than the threshold value, control branches at step 407 to the end of the routine and the multiple broadcast session is aborted, because an insufficient number of receiving stations have message-assigned logical links available.

As illustrated in FIG. 4B, when the request signal RQST is received in the responder 12a (step 410), the responder 12a of the receiving station determines, at step 411, whether the assigned logical link is available at the receiving station. If not, control returns to the start of the routine. If the assigned logical link is available, control branches to step 412 where the responder 12a establishes the assigned link from the receiving station to the sending station, and transmits an unnumbered ACK response (step 413) to the sending station. The receiving station then waits to receive a broadcast message on the established link.

In FIG. 5A, all logical links are searched for idle links and as many idle logical links as there are broadcast messages are selected (step 500) and the selected logical links are assigned respectively to the messages (step 501). As mentioned previously in connection with the second embodiment, variable "i" is set to one and "j" is set to zero (step 502) in the counter 11b and a numbered request signal RQST(i) is transmitted via request signal generator 11a, at step 503, the request signal RSQT(i) containing a list of the assigned logical link numbers and a list of the message numbers. After starting the acknowledgment timer (step 504), the sending station checks the timer, at step 505, to see if the timeout period has expired and checks, at step 506, to see if it received a numbered ACK(i) response. Each time an ACK(i)is received, control proceeds to step 507 to increment the variable "j" by one and returns to step 505. When the acknowledgment timer runs out, control branches at step 505 to step 508 to determine whether the variable "j" is equal to or greater than the threshold value. If the decision at step 508 yields an affirmative answer, control exits to step 509 to send multiple broadcast messages respectively over the assigned logical link via broadcast transmitter 11c in the same manner as described with reference to FIG. 4A. If the number of the ACK(i) responses is smaller than the threshold value, control branches at step 508 to step 510 to determine whether the variable "i" is equal to 5. If not, control increments the variable "i" by one at step 511 and returns to step 503 to repeat the process for further transmission of request signal.

In FIG. 5B, if a numbered request signal RQST(i) is received at the responder 12a of a receiving station (step 520), the responder 12a determines, at step 521, whether all the assigned logical links are already established between the receiving station and the sending station. If the answer is affirmative at step 521, control simply returns to the star of the routine, waiting for the broadcast message to be sent on the already established link. If the answer is negative at step 521, control branches to step 522 where the responder 12a determines whether all the assigned links are available at the receiving station. If not, control returns to the start at the routine. Otherwise, it branches to step 523 where the responder 12a establishes all the assigned logical links from the receiving station to the sending station, and transmits a numbered ACK(i) response (step 524) to the sending station to receive multiple broadcast messages respectively on the established links.

Figure 6A:
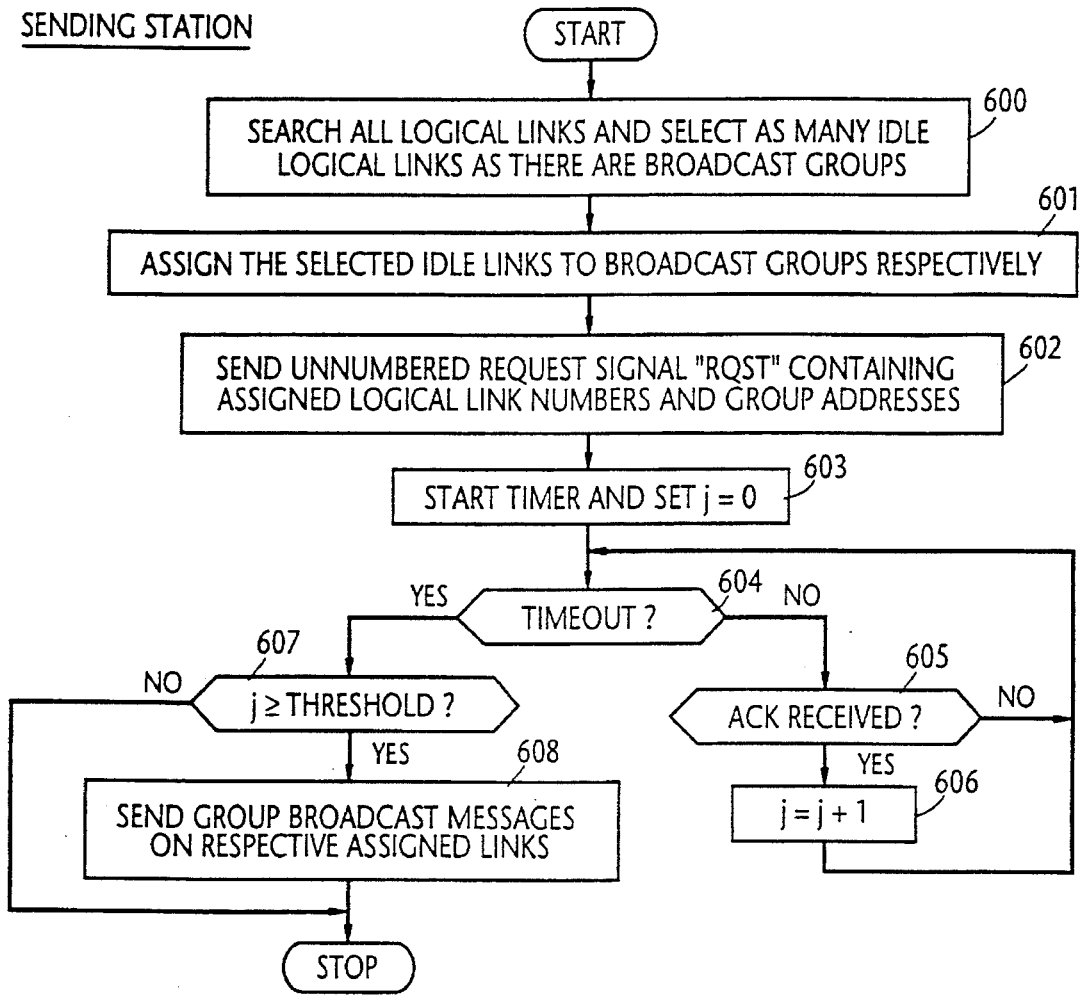
FIGS. 6A and 6B are flowcharts respectively showing the operation of sending and receiving stations according to a fourth embodiment of the present invention.
Figure 6B:
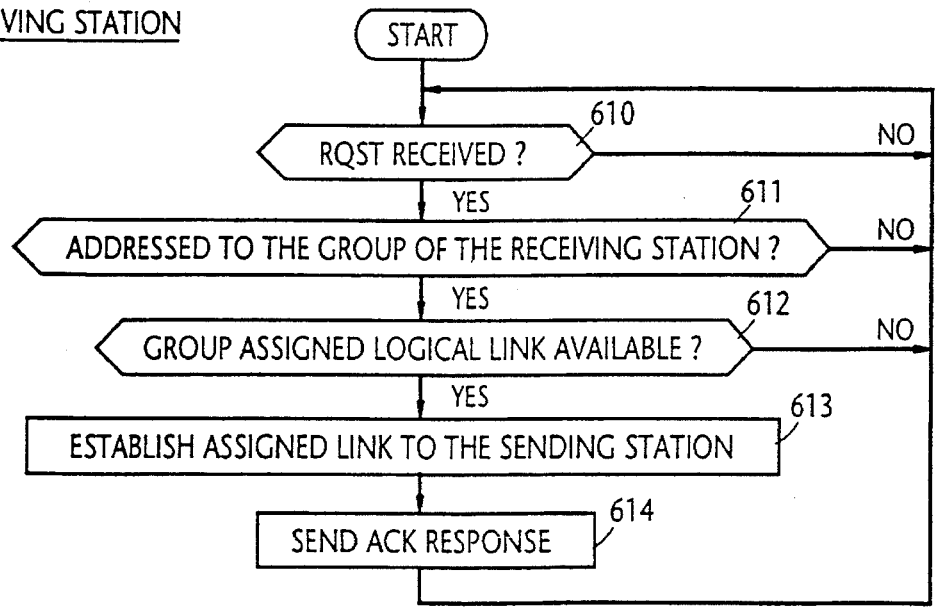

A logical link control protocol according to a fourth embodiment of the present invention is shown in FIGS. 6A and 6B in which all the receiving stations are divided into broadcast groups $g_1 \sim g_k$ each being identified with a unique group address. According to this embodiment, group broadcasts are performed by respectively assigning logical links to the broadcast groups and simultaneously transmitting respective broadcast messages to the broadcast groups over the assigned links. In this embodiment, group addresses are not contained in each of the broadcast messages and hence, the overhead of each message is small in comparison with prior art group broadcast. In FIGS. 6A and 6B the group broadcast addressing is combined with the first embodiment.

In FIG. 6A, at step 600 sending station 11 searches all logical links and selects "k" idle logical links and assigns them respectively to the broadcast groups $g_1 \sim g_k$ (step 601). At step 602, the request signal generator 11a of the sending station transmits an unnumbered request signal RQST containing a list of the assigned logical link numbers and a list of the group addresses, specifying which topical link to be used by each broadcast group. The acknowledgment timer is then started and the variable "j" in counter 11b is set to zero (step 603). During the acknowledgment period, the sending station checks the timer to see if the timeout period has expired (step 604) and checks to see if it received an unnumbered ACK response (step 605). Each time an ACK is received, control proceeds to step 606 to increment variable "j" by one and returns to step 604. When the acknowledgment period runs out, control branches at step 604 to step 607 to determine whether the variable "j" is equal to or greater than the threshold value. If the decision at step 607 yields an affirmative answer, control exits to step 608 to send group broadcast messages respectively over the assigned logical links via broadcast transmitter 11c, so that broadcast messages $m_1 \sim m_k$ are respectively received by broadcast groups $g_1 \sim g_k$ of receiving stations. If the number of the received ACK responses is smaller than the threshold value, control branches at step 607 to the end of the routine to abort the group broadcast because there is an insufficient number of receiving stations having the assigned logical link available.

As illustrated in FIG. 6B, if the request signal RQST is received at the responder 12a of a receiving station (step 610), the responder 12a examines, at step 611, the address field of the signal and determines whether it is addressed to the broadcast group to which the receiving station belongs. If it is, control branches to step 612 where the responder 12a examines the source address field and the link number field of the request signal to detect one of the logical links which is assigned to the group of the receiving station and determine whether the group-assigned link is available at the receiving station. If it is not, control returns to the star of the routine. Otherwise, it branches to step 613 where the responder 12a establishes the group-assigned logical link from the receiving station to the sending station, and transmits an unnumbered ACK response (step 614) to the sending station, readying the receiving station to receive a group broadcast message on the established link.

The group addressing broadcast feature is combined with the second embodiment as illustrated in FIGS. 7A and 7B. In FIG. 7A, sending station 11 searches all logical links and selects "k" idle logical links (step 700), assigns them respectively to the broadcast groups $g_1 \sim g_k$ (step 701), sets variable "i" to one and variable "j" to zero (step 702), and the request signal generator 11a transmits, at step 703, a numbered request signal RQST(i) containing a list of the assigned logical link numbers and a list of the group addresses. The acknowledgment timer is started and the variable "j" in counter 11b is set to zero (step 704). During the acknowledgment period, the sending station checks to see if the timeout period has expired (step 705) and checks, at step 706, to see if it received an ACK(i) response. Each time an ACK(i) is received, control branches at step 706 to step 707 to increment variable "j" by one and returns to step 705. When the acknowledgment period expires, control branches at step 705 to step 708 to determine whether the variable "j" is equal to or greater than the threshold value. If the decision at step 708 is affirmative, control exits to step 709 to send group broadcast messages respectively over the assigned logical links via broadcast transmitter 11c. If the number of the received ACK(i) responses is smaller than the threshold value, control branches at step 708 to step 710 to determine whether the variable "i" is equal to 5. If not, control increments it by one at step 711 and returns to step 703 to repeat the process for further transmission of request signal until it is repeated five times as long as the variable "j" is smaller than the threshold value.

In FIG. 7B, if a request signal RQST(i) is received at the responder 12a of a receiving station (step 720); the responder 12a examines the address field of the signal and determines whether it is addressed to the group of the receiving station (step 721). If it is, control branches to step 722 where the responder 12a examines the source address field and the link number field to the request signal to detect one of the logical links which is assigned to the group of the receiving station and determine whether the assigned link is already established between the receiving station and the sending station. If the answer is affirmative at step 722, control simply returns to the star of the routine, waiting far the broadcast message to be sent on the already established link. If the answer is negative at step 722, control branches to step 723 where the responder 12a determines whether the assigned link is available at the receiving station. If not, control returns to the star of the routine. Otherwise, control branches to step 724 where the responder 12a establishes the assigned logical link from the receiving station to the sending station, and transmits a numbered ACK(i) response (step 725) to the sending station.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A data communication system having a sending station, a plurality of receiving stations and a network for interconnecting said sending station and said receiving stations, the system comprising:

a request signal generator provided in said sending station for transmitting a request signal to said receiving stations, said request signal containing a logical link number indicating an idle logical link;

a responder provided in each of said receiving stations for receiving said request signal and for determining whether a logical link identified by said logical link number is available at a respective receiving station, and if said logical link is determined to be available, transmitting an acknowledgement signal to said sending station and establishing said logical link between said sending station and said respective receiving station;

a counter provided in said sending station for receiving said acknowledgement signal from each of said receiving stations and counting the received acknowledgement signal during a predetermined timeout period; and a broadcast transmitter provided in said sending station for transmitting a broadcast message over the established logical link when the number of acknowledgement signals counted by said counter exceeds a threshold value.

2. A data communication system as claimed in claim 1, wherein said counter means includes means for causing said request signal generator to transmit said request signal again if the number of acknowledgment signals counted by the counter means does not exceed said threshold value.

3. A data communication system as claimed in claim 2, wherein said receiving stations are divided into a plurality of groups which are respectively identified by group addresses, wherein said request signal generator includes means for transmitting said request signal containing said group addresses and a plurality of said logical link numbers respectively corresponding to said group addresses, wherein each of said receiving stations further comprises means for determining whether the logical link identified by the logical link number corresponding to the group address of a respective receiving station is available, and for causing said responder to transmit said acknowledgement signal if said logical link is determined to be available.

4. A data communication system as claimed in claim 2, wherein said request signal generator includes means for transmitting said request signal containing a plurality of logical link numbers respectively corresponding to multiple broadcast messages, wherein each of said receiving stations further comprises means for determining whether the logical links identified by the logical link numbers are available, and for causing said responder to transmit said acknowledgement signal if said logical links are determined to be available.

5. A data communication system as claimed in claim 1, wherein said receiving stations are divided into a plurality of groups which are respectively identified by group addresses, wherein said request signal generator includes means for transmitting said request signal containing said group addresses and a plurality of said logical link numbers respectively corresponding to said group addresses, wherein each of said receiving stations further comprises means for determining whether the logical link identified by the logical link number corresponding to the group address of a respective receiving station is available, and for causing said responder to transmit said acknowledgment signal if said logical ink is determined to be available.

6. A data communication system as claimed in claim 1, wherein said request signal generator includes means for transmitting said request signal containing a plurality of logical link numbers respectively corresponding to multiple broadcast messages, wherein each of said receiving stations further comprises means for determining whether the logical links identified by the logical link numbers are available, and for causing said responder to transmit said acknowledgement signal if said logical links are determined to be available.

7. In a data communication system having a sending station, a plurality of receiving stations and a network for interconnecting said sending station and said receiving stations, a method comprising the steps of:

a) transmitting a request signal from said sending station to said receiving stations, said request signal containing a logical link number indicating an idle logical link;

b) receiving said request signal at each of said receiving stations and determining whether the logical link number is available at each of the receiving stations;

c) if said logical link number is determined to be available, establishing a logical link from each receiving station to said sending station and transmitting an acknowledgment signal from each receiving station to said sanding station;

d) receiving said acknowledgment signal at said sending station and counting the received acknowledgment signal during a predetermined timeout period; and e) transmitting a broadcast message from said sending station over the established logical link when the number of acknowledgment signals counted exceeds a threshold value.

8. In a data communication system having a sending station, a plurality of receiving stations and a network for interconnecting said sending station and said receiving stations, a method comprising the steps of:

a) transmitting a request signal from said sending station to said receiving stations, said request signal containing a logical link number indicating an idle logical link and a sequential number;

b) receiving said request signal at each of said receiving stations and determining whether a logical link identified by the logical link number is already established between said sending station and each receiving station;

c) if said logical link is determined to be not already established at a respective receiving station, determining whether said logical link is available at the respective receiving station;

d) if said logical link is determined to be available at the respective receiving station, establishing said logical link from the respective receiving station to said sending station and transmitting an acknowledgement signal from the respective receiving station to said sending station;

e) receiving said acknowledgement signal at said sending station and counting the received acknowledgement signal during a predetermined timeout period;

f) if the number of acknowledgment signals counted exceeds a threshold value, transmitting a broadcast message from said sending station over the established logical link; and g) if the number of acknowledgment signals counted does not exceed said threshold value during said predetermined timeout period, incrementing said sequential number by one, transmitting a request signal containing said logical link number and the incremented sequential number, and repeating the steps (b) to (f) until said sequential number reaches a preset number.

9. In a data communication system having a sending station, a plurality of receiving stations and a network for interconnecting said sending station and said receiving stations, a method comprising the steps of:

a) transmitting a request signal from said sending station to said receiving stations, said request signal containing a plurality of logical link numbers respectively indicating idle logical links;

b) receiving said request signal at each of said receiving stations and determining whether logical links identified by the logical link numbers are available at each receiving station;

c) if said logical links are determined to be available at a respective receiving station, establishing said logical links from the respective receiving station to said sending station and transmitting an acknowledgment signal from the respective receiving station to said sending station;

d) receiving said acknowledgment signal at said sending station and counting the received acknowledgment signal during a predetermined timeout period; and e) transmitting multiple broadcast messages from said sending station over the established logical links, respectively, when the number of acknowledgment signals counted exceeds a threshold value.

10. In a data communication system having a sending station, a plurality of receiving stations and a network for interconnecting said sending station and said receiving stations, a method comprising the steps of:

a) transmitting a request signal from said sending station to said receiving stations, said request signal containing a plurality of logical link numbers respectively indicating idle logical links;

b) receiving said request signal at each of said receiving stations and determining whether logical links identified by the logical link numbers are already established between said sending station and each receiving station;

c) if said logical links are determined to be not already established at a respective receiving station, determining whether said logical links are available at the respective receiving station;

d) if said logical links are determined to be available at the respective receiving station, establishing said logical links from the respective receiving station to said sending station and transmitting an acknowledgment signal from the respective receiving station to said sending station;

e) receiving said acknowledgment signal at said sending station and counting the received acknowledgment signal during a predetermined timeout period; and f) transmitting multiple broadcast messages from sending station over said established logical links, respectively, when the number of acknowledgment signals counted exceeds a threshold value.

11. In a data communication system having a sending station, a plurality of receiving stations and a network for interconnecting said sending station and said receiving stations, wherein said receiving stations are divided into a plurality of groups respectively identified by group addresses, a method comprising the steps of:

a) transmitting a request signal from said sending station to said receiving stations, said request signal containing said group addresses and a plurality of logical link numbers indicating idle logical links corresponding respectively to said group addresses;

b) receiving said request signal at each of said receiving stations and determining whether a logical link identified by the logical link number corresponding to the group address of each receiving station is available;

c) if said logical link is determined to be available at a respective receiving station, establishing said logical link from the respective receiving station to said sending station and transmitting an acknowledgment signal from the respective receiving station to said sending station;

d) receiving said acknowledgment signal at said sending station and counting the received acknowledgment signal during a predetermined timeout period; and e) transmitting a broadcast message from said sending station over the established logical links when the number of acknowledgment signals counted exceeds a threshold value.

12. In a data communication system having a sending station, a plurality of receiving stations and a network for interconnecting said sending station and said receiving stations, wherein said receiving stations are divided into a plurality of groups respectively identified by group addresses, a method comprising the steps of:

a) transmitting a request signal from said sending station to said receiving stations, said request signal containing said group addresses, a plurality of logical link numbers indicating idle logical links corresponding respectively to said group addresses, and a sequential number;

b) receiving said request signal at each of said receiving stations and determining whether a logical link identified by the logical link number corresponding to the group address of a respective receiving station is already established;

c) if said logical link is determined not to be already established at the respective receiving station, determining whether said logical link is available at the respective receiving station, d) if said logical link number is determined to be available at the respective receiving station, establishing said logical link from the respective receiving station to said sending station and transmitting an acknowledgment signal from the respective receiving station to said sending station;

e) receiving said acknowledgment signal at said sending station and counting the received acknowledgment signal during a predetermined timeout period;

f) if the number of acknowledgment signals counted by the step (e) exceeds a threshold value, transmitting group broadcast messages from said sending station over the established logical links, respectively; and g) if the number of acknowledgement signals counted by the step (e) does not exceed said threshold value during said predetermined timeout period, incrementing said sequential number by one, transmitting a request signal containing said logical link number and the incremented sequential number, and repeating the steps (b) to (f) until said sequential number reaches a preset number.

* * * * *